United States Patent [19]

Musso, Jr. et al.

[11] Patent Number: 5,400,974
[45] Date of Patent: * Mar. 28, 1995

[54] DUMP TRUCK WITH CONVEYOR DISPENSING SYSTEM

[75] Inventors: Charles S. Musso, Jr., Hammondsport; Tom W. Musso, Bath, both of N.Y.

[73] Assignee: Air-Flo Mfg. Co. Inc., Prattsburg, N.Y.

[ * ] Notice: The portion of the term of this patent subsequent to May 10, 2011 has been disclaimed.

[21] Appl. No.: 219,911

[22] Filed: Mar. 30, 1994

Related U.S. Application Data

[63] Continuation of Ser. No. 892,250, Jun. 2, 1992, Pat. No. 5,310,119.

[51] Int. Cl.⁶ ............................ B60P 1/04; B60P 1/36
[52] U.S. Cl. ..................................... 239/672; 239/657
[58] Field of Search ............... 222/271, 278, 371, 415; 239/657, 672, 673

[56] References Cited

U.S. PATENT DOCUMENTS

| | | |
|---|---|---|
| 2,057,759 | 10/1936 | Bissell . |
| 2,060,652 | 11/1936 | Arnold . |
| 2,233,111 | 2/1941 | Roberts . |
| 2,517,151 | 8/1950 | Weston . |
| 2,705,149 | 3/1955 | Torrey . |
| 3,064,837 | 11/1962 | Manney . |
| 3,167,319 | 1/1965 | Kerr . |
| 3,502,245 | 3/1970 | Hoffstetter . |
| 3,559,893 | 2/1971 | Gruben .................. 239/664 |
| 3,583,646 | 6/1971 | Bogenschutz . |
| 3,610,474 | 10/1971 | Usher et al. . |
| 3,794,194 | 2/1974 | Holland . |
| 4,005,790 | 2/1977 | Holland . |
| 4,056,283 | 11/1977 | Pow ...................... 298/17.6 |
| 4,345,869 | 8/1982 | King . |
| 4,522,341 | 6/1985 | Wall et al. ................ 239/672 |
| 4,568,028 | 2/1986 | Verseef et al. ............ 239/657 |
| 4,767,063 | 8/1988 | Wall et al. ................ 239/672 |
| 4,886,214 | 12/1989 | Musso, Jr. et al. ......... 239/67.6 |

Primary Examiner—Michael S. Huppert
Assistant Examiner—Janice L. Krizek
Attorney, Agent, or Firm—Chilton, Alix & Van Kirk

[57] ABSTRACT

A dump truck having a longitudinally extending conveyor structurally integrated into the bottom structure of the dump body of the truck. A hydraulic drive system is selectively operable for running the conveyor in each direction for dispensing the material contents of the dump body at the front and rear ends of the dump body. Front and rear spreaders are mounted on the truck frame at the front and rear ends of the conveyor for spreading the dispensed material onto the roadway in front of and rearwardly of the rear wheels of the truck.

16 Claims, 5 Drawing Sheets

DUMP TRUCK WITH CONVEYOR DISPENSING SYSTEM

The present application is a continuation of application Ser. No. 07/892,250, filed Jun. 2, 1992, and entitled "Dump Truck With Conveyor Dispensing System", now U.S. Pat. No. 5,310,119.

SUMMARY OF THE INVENTION

The present invention relates generally to dump trucks and more particularly to a dump truck of the type having a conveyor integrated into the dump truck body to enable the truck to be used in both dump and conveyor dispensing modes of operation.

It is a principal aim of the present invention to provide in a dump truck of the type described, a new and improved conveyor dispensing system which provides for dispensing the material contents of the dump body in front of the rear wheels of the truck. In accordance with the present invention, the conveyor is operable for conveying the material to and dispensing the material at the front end of the dump body and a spreader is mounted below the front end of the conveyor for spreading the dispensed material onto the roadway.

It is a further aim of the present invention to provide in a dump truck of the type described, a new and improved conveyor dispensing system which can dispense the material contents of the dump body both in front of and rearwardly of the rear wheels of the truck.

Other objects will be in part obvious and in part pointed out more in detail hereinafter.

A better understanding of the invention will be obtained from the following detailed description and accompanying drawings of an illustrative application of the invention.

DESCRIPTION OF THE PREFERRED EMBODIMENT

Figure 1:
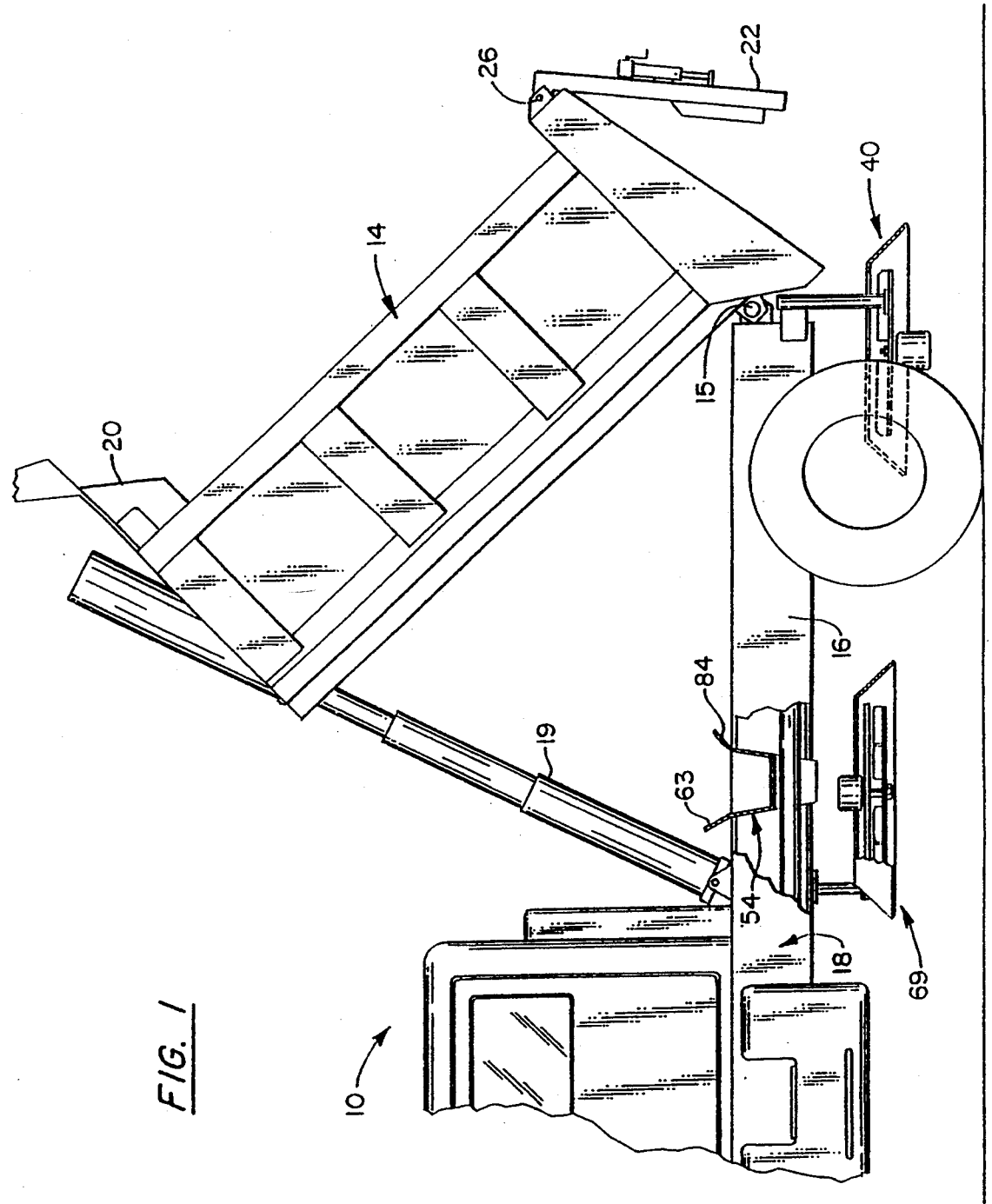
FIG. 1 is a partial, side elevation view, partly broken away and partly in section, of a dump truck incorporating a conveyor dispensing system according to the present invention and showing the dump body of the truck in its fully raised position.

Referring now to the drawings in detail wherein like numerals are used to designate the same or like parts, a dump truck 10 incorporating a preferred embodiment of the present invention has a dump body 14 pivotal about a rear pivot axis 15 between a normal or horizontal position resting on a pair of parallel longitudinal beams or rails 16 of the truck frame 18 and a fully raised dump position shown in FIG. 1. A hydraulic lift cylinder 19 is connected between the truck frame 18 and front end of the dump body 14 to hydraulically raise and lower the dump body 14 in a conventional manner. A rearwardly offset section 20 of the front sidewall 21 of the dump body 14 forms a central upright housing for receiving the lift cylinder 19 in a conventional manner.

A pivotal tailgate 22 at the rear end of the dump body 14 is adapted to be unlatched to dump the material contents of the dump body 14 through the tailgate opening when the dump body 14 is raised. The tailgate 22 is pivotally mounted at its top by pivot pins 26. Latches (not shown) are provided at the bottom of the tailgate 22 on each side of the tailgate opening for latching the tailgate 22 in its normal closed position in a conventional manner.

A conveyor dispensing system is integrated into the dump truck 10 to provide a multiple purpose truck useful in both dump and conveyor dispensing modes of operation. The conveyor dispensing system comprises a central, longitudinally extending, endless conveyor 32 integrated into the bottom structure 34 of the dump body 14. The effective width of the conveyor 32 is established by an overlying, longitudinally extending, conveyor opening between a pair of laterally spaced, downturned edges 35 of the outer coplanar sections 68 of the dump body floor. The dispensing system can be used in a rear dispensing mode of operation by operating the endless conveyor 32 to convey the material contents of the dump body 14 to the rear end of the dump body to dispense the material in back of the rear wheels of the truck. A rear spreader 40 is mounted on the truck frame 18 for spreading the material onto the roadway. For example, the rear dispensing system is like that disclosed in U.S. Pat. No. 4,886,214, dated Dec. 12, 1989 and entitled "Dump Truck With Integrated Spreader System". Reference should be made to U.S. Pat. No. 4,886,214 for any details of the rear dispensing system not disclosed herein. Accordingly, U.S. Pat. No. 4,886,214 is incorporated herein by reference. Briefly, the rear dispensing system comprises a rear door and door opening (not shown) in the tailgate 22 aligned with the conveyor 32, a gravity chute (not shown) below the rear end of the conveyor 32 and a spinner type spreader 40. The spreader 40 is mounted on the truck frame to be swung into an operating position below the chute and rear end of the conveyor 32.

In accordance with the present invention, the conveyor dispensing system can also be used in a front dispensing mode of operation to dispense the material contents of the dump body 14 in front of the rear wheels of the truck. The front dispensing system comprises a hood 46 mounted over the front end of the conveyor 32. The hood 46 has a front plate 47, two laterally spaced, parallel side plates 48 and a downwardly and rearwardly inclined cover plate 49. A rear inlet opening 50 is defined by the rear ends of the cover plate 49 and two side plates 48. The hood inlet opening 50 is aligned with and extends laterally the full width of the conveyor opening and for example has a 4 inch height above a conveyor bed plate 106. In the front dispensing mode of operation, the material contents of the dump body 14 are conveyed forwardly through the hood inlet opening 50 and off the forward end of the conveyor 32. An inlet door (not shown) may be provided in the inlet opening 50 but normally is not necessary to prevent inadvertent discharge of material when the conveyor 32 is not being operated in the front dispensing mode of operation.

A gravity chute 54 is mounted on and between the main longitudinal beams 16 of the truck frame 18 below the front end of the conveyor 32. The chute 54 has front and rear, longitudinally spaced, sidewalls 55, 56 and outer, lateral sidewalls 57, 58. The chute 54 has a central, inverted-V shaped deflector 60 over the truck drive shaft 62 to deflect the material laterally in both directions away from the drive shaft 62. Two laterally spaced, chute outlet openings are thereby formed for discharging the material downwardly on opposite sides of and below the drive shaft 62. The front and rear sidewalls 55, 56 of the chute are inclined downwardly and inwardly toward each other. The lateral sidewalls 57, 58 are also inclined downwardly and inwardly toward each other. Thus, the longitudinal and lateral width of the chute inlet opening is greater than that of the two chute outlet openings. The lateral width of the chute inlet opening extends substantially the entire distance between the upper flanges of the truck beams 16. A forwardly inclined flange or deflector 63 is provided at the top of the front sidewall 55 to deflect material rearwardly into the chute opening.

A front spreader 69 is mounted on the frame 18 with its spinner 70 centrally located between the beams 16 and directly below the two chute outlet openings. A vertical mounting post 71 is fixed to one of the beams 16 and the spinner is mounted on a support arm 72 fixed to the post 71. A suitable deflector 73 is provided around the spinner 70 for deflecting the material thrown outwardly by the spinner 70 downwardly onto the roadway. A hydraulic drive motor 74 is mounted above the spinner 70 and directly coupled to the spinner 70 for rotating the spinner 70 in a conventional manner.

Figure 3:
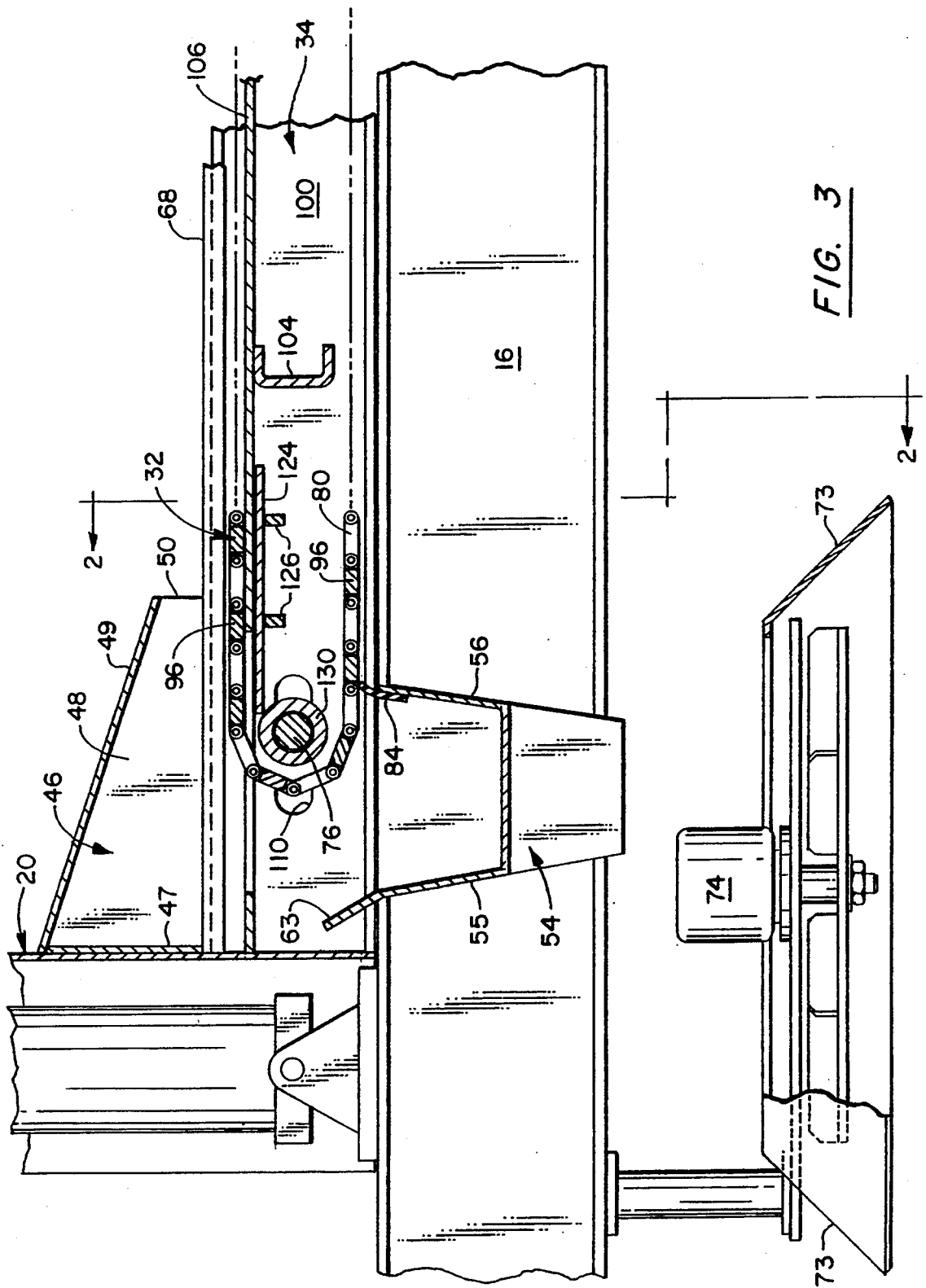
FIGS. 3 and 4 are enlarged, partial, longitudinal elevation section views, partly broken away and partly in section, of the dump truck with the dump body in its lower normal position and showing the front end of the conveyor dispensing system.
Figure 4:
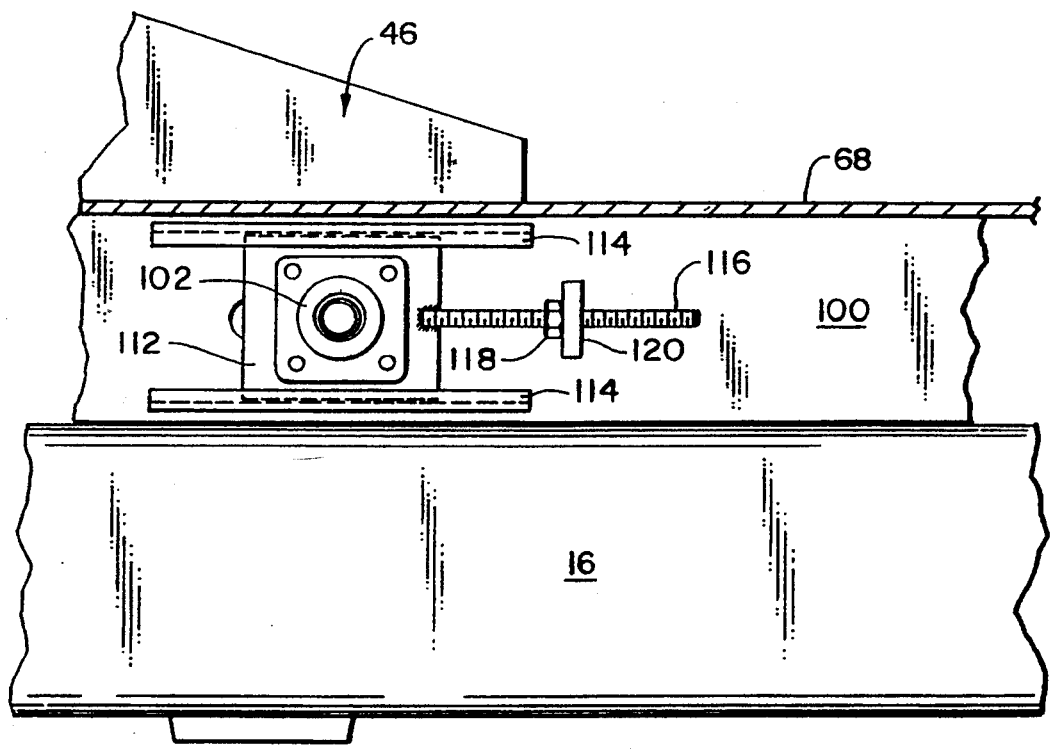

The endless conveyor 32 comprises front and rear sprocket shafts 76 (which may be identical except as otherwise described). Each sprocket shaft 76 has a pair of laterally spaced sprockets 78 supporting a pair of laterally spaced conveyor drive chains 80. As shown in FIG. 3, the front sprocket shaft 76 is mounted so that the forward end of the conveyor 32 is located slightly (e.g., approximately one foot) to the rear of the lift cylinder housing 20. The front sprocket shaft 76 is directly below the front hood 46 and is forward of the hood inlet opening 50. The flights 96 of the conveyor 32 are suitably connected to the links of the conveyor chains 80. The flights 96 preferably are flat bars (e.g., one-half inch thick and two inches wide) spaced about four inches apart. The upper plane of the conveyor flights 96 is recessed slightly (e.g., two inches) below the flat outer floor sections 68 of the dump body 14.

The front end of the conveyor 32 extends forwardly beyond the rear sidewall 56 of the chute 54. Material conveyed off the forward end of the conveyor 32 falls by gravity into the chute 54 and through the chute 54 onto the spinner 70. A flexible rubber scraper 84 is provided along the top rear edge of the chute inlet to scrape against the flights 96 and thereby help remove any material adhering to the flights 96.

Figure 5:
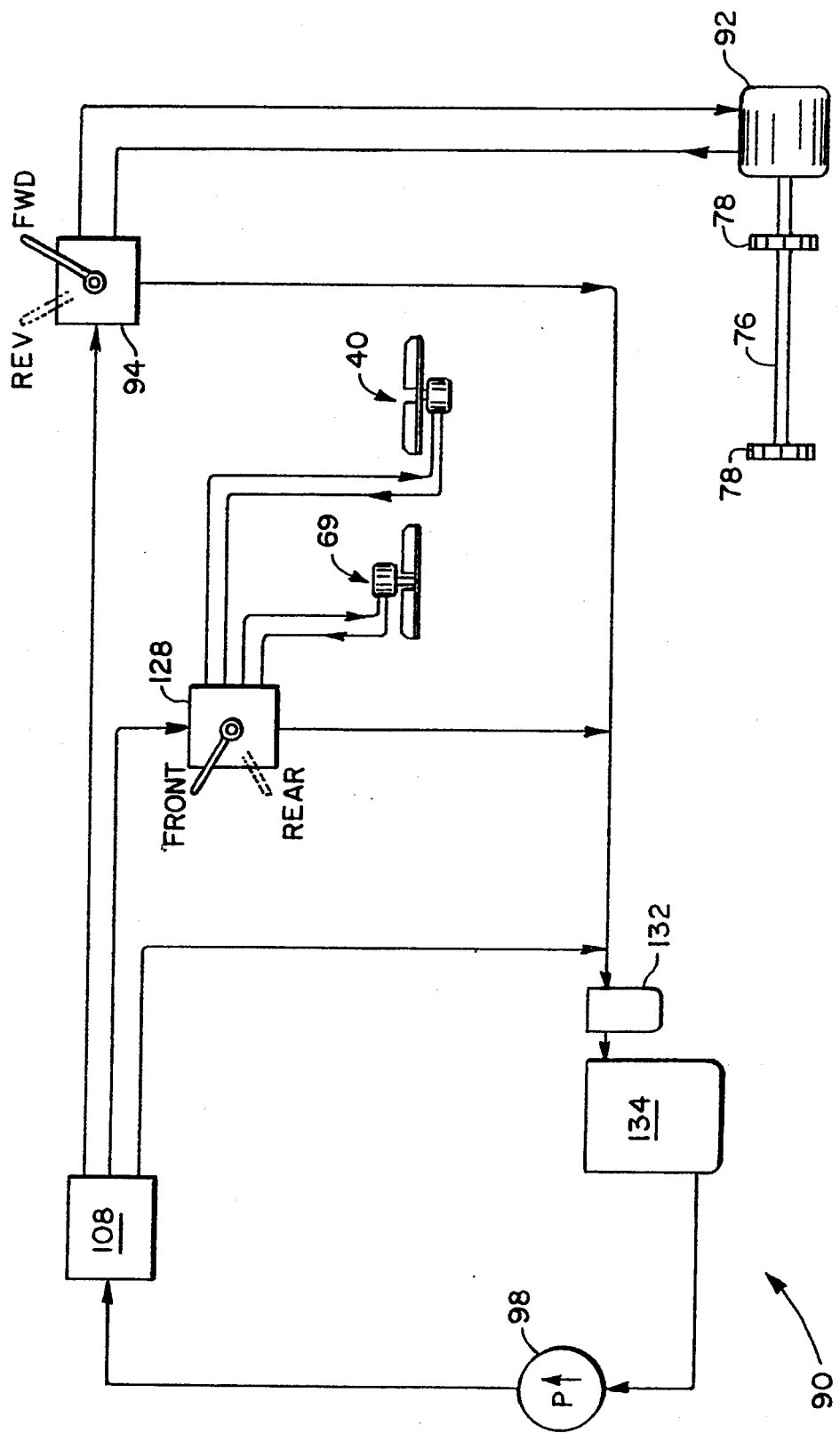
FIG. 5 is a generally diagrammatic illustration of a hydraulic drive system of the conveyor dispensing system.

A suitable hydraulic drive system is connected to the front and rear spinners and to the front and/or rear sprocket shafts 76 to drive the conveyor dispensing system in either direction. An exemplary hydraulic system 90 having a hydraulic pump 98, hydraulic reservoir 134 and reservoir inlet filter 132 is schematically illustrated in FIG. 5. A pressure relief valve 108 provides for returning excess hydraulic fluid via the filter 132 to the reservoir 134. A reversible hydraulic motor 92 is directly coupled to the front sprocket shaft 76. A second reversible motor 92 (not shown), if provided, is directly coupled to the rear sprocket shaft 76, in which case, the two motors 92 are connected in parallel to be operated together. The motor(s) 92 is/are selectively operated by a manual selector valve 94 to drive the conveyor 32 forwardly or rearwardly as desired. A second manual selector valve 128 is provided for selectively operating the spinners of the front and rear spreaders 69, 40. Thus, the truck 10 can be selectively used in its front and rear dispensing modes of operation as desired. The front dispensing mode of operation can be used without any required changeover to that mode of operation. The rear dispensing mode of operation can be used merely by manually configuring the rear dispensing system for that mode of operation.

The conveyor 32 has a pair of parallel, inwardly facing, channel beams 100 which extend longitudinally the full length of the dump body 14. The channel beams 100 also provide the principal longitudinal structural members of the dump body 14. The two beams 100 are aligned with and rest on the two central rails 16 of the vehicle frame 18 when the dump body 14 is in its lower or normal position. The front and rear sprocket shafts 76 extend through openings in the central vertical webs of the channel beams 100 and are rotatably supported by bearings 102 mounted on the outside faces of the beams 100. The conveyor sprockets 78 and drive chains 80 are mounted adjacent the inside faces of the channel beams 100 between the upper and lower beam flanges. A plurality of longitudinally spaced, transverse beams 104, which may be channel beams or I-beams, extend between and are welded to the channel beams 100 between the upper and lower planes of the conveyor flights 96. A fixed bed plate 106 is welded to the top of each intermediate beam 104 to provide an intermediate floor section, recessed below the remaining floor sections 68 of the dump body 14. The bed plate 106 also provides a planar support for the drive chains 80 and conveyor flights 96.

The front sprocket shaft 76 is mounted for longitudinal adjustment for adjusting the tension of the drive chains 80. Elongated shaft openings 110 are provided in the central webs of the conveyor beams 100 for that purpose. The front sprocket shaft bearings 102 are mounted on bearing support plates 112. The support plates 112 are mounted for longitudinal adjustment within opposed parallel guides 114 welded to the conveyor beams 100. The forward end of an adjustment screw 116 is welded to each bearing mounting plate 112. An adjustment nut 118 is mounted on the adjustment screw 116 for engagement with a fixed stop 120 welded to the adjacent beam 100. The two adjustment nuts 118 for the two mounting plates 112 are manually adjusted with a suitable wrench to adjust the longitudinal position of the bearing plates 112 and thus the longitudinal position of the front sprocket shaft 76.

Figure 2:
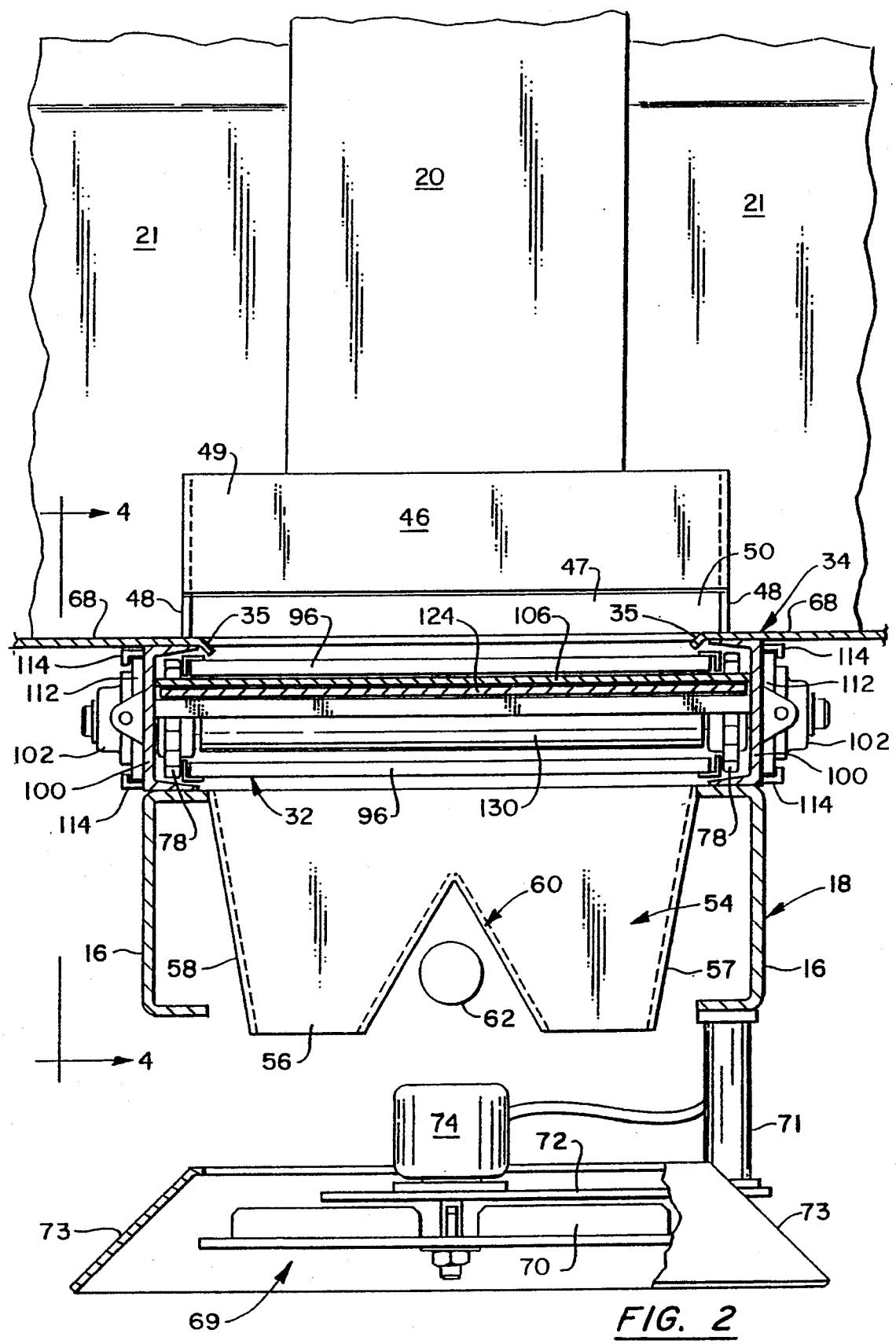
FIG. 2 is an enlarged, partial, transverse elevation section view, partly broken away and partly in section, of the dump truck with the dump body in its lower normal position resting on the truck frame and showing the front end of the conveyor dispensing system.

A sliding bed plate 124 is provided at and immediately below the front end of the fixed bed plate 106. The sliding bed plate 124 is supported by a pair of flat transverse bars 126 extending between and welded to the beams 100. The sliding bed plate 124 underlies the front end of the fixed bed plate 106 and in effect provides a slidable forward extension of the fixed bed plate 106. The front edge of the sliding bed plate 124 is welded to a cylindrical collar 130 mounted on the front sprocket shaft 76. Accordingly, the collar 130 and sliding bed plate 124 are longitudinally adjusted with the front sprocket shaft 76. As shown in FIG. 2, the sliding bed plate 124 has a width greater than the width of the conveyor opening. Notches (not shown) are provided in the front corners of the bed plate 124 for receiving the drive chain sprockets 78. The cylindrical collar 130 extends substantially the full distance between the front two sprockets 78 and substantially the full width of the conveyor opening. The sliding bed plate 124 and collar 130 therefore provide the front end or nose of the conveyor about which the material contents of the truck body are dispensed in the front dispensing mode of operation. The sliding bed plate 124 and collar 130 ensure that the material is dispensed into the chute 54 throughout the full range of adjustment of the front sprocket shaft 76. The longitudinal width of the chute inlet opening is sufficient to receive the material throughout the full range of shaft adjustment.

The remainder of the bottom structure 34 of the dump body 14 is like that disclosed in U.S. Pat. 4,886,214. By virtue of the integrated bottom structure 34, the structural integrity of the dump body 14 is maintained notwithstanding the provision of a central, longitudinally extending conveyor 32 having an effective transverse width approximately one-third the inside width of the dump body 14. With the integrated structure, use of the truck 10 in its dump mode is not restricted by the conveyor 32 or truck mounted spreaders 40, 69. Also, the capacity and strength of the dump body 14 are not adversely affected. Further, in both the front and rear dispensing modes of operation, nearly the entire contents of the dump body 14 can be dispensed by the central, recessed conveyor 32. After most of the material contents have been dispensed, any remaining material can be dispensed merely by raising the dump body 14 slightly to shift the remaining material to the rear end of the dump body. Most of the remaining material can then be dispensed by the conveyor 32 by either the front or rear dispensing mode of operation after lowering the dump body back to its lower normal position.

As will be apparent to persons skilled in the art, various modifications, adaptations and variations of the foregoing specific disclosure can be made without departing from the teachings of the present invention.

We claim:

1. In a dump truck having a truck frame with a pair of laterally spaced and longitudinally extending rails, a dump body having a forward end and a rearward end and being pivotally mounted at the rearward end thereof on the truck frame, lift means connected between the truck frame and dump body for raising and lowering the forward end of the dump body between a lower normal position thereof resting on the truck frame and an upper raised position thereof, the dump body forming a receptacle having a bottom, front and laterally spaced sidewalls and a rear tailgate opening and having a tailgate pivotal between an open position thereof and a closed position thereof closing the tailgate opening, the dump body having a bottom structure, providing the bottom of the dump body receptacle, with an integrated, longitudinally extending, endless conveyor having a front end and a rear end and forming part of the bottom of the dump body receptacle, the conveyor being operable for longitudinally conveying material within the receptacle for dispensing the material from the receptacle, and a spreader system mounted on the truck for spreading the material dispensed by the conveyor; the improvement wherein the dump body has a conveyor hood, mounted over the front end of the conveyor, having a rearwardly facing conveyor opening at the forward end of the dump body receptacle and rearwardly of the front end of the conveyor, wherein the conveyor has a drive system selectively operable for running the conveyor in a forward conveyance mode of operation for conveying material within the receptacle forwardly through the conveyor opening and dispensing the material off the front end of the conveyor, wherein the dump truck comprises a gravity chute mounted on the truck frame between the longitudinally extending rails for receiving material dispensed off the front end of the conveyor, and wherein the spreader system comprises a front spreader mounted on the truck frame below the chute for spreading the dispensed material.

2. A dump truck according to claim 1 wherein the conveyor drive system is selectively operable for running the conveyor in a rearward conveyance mode of operation for conveying material within the receptacle rearwardly and dispensing the material off the rear end of the conveyor.

3. A dump truck according to claim 2 wherein the conveyor drive system comprises a reversible motor for selectively running the conveyor in opposite directions for running the conveyor in the forward and rearward conveyance modes of operation respectively and a selector for selectively operating the reversible motor for running the conveyor in each direction.

4. A dump truck according to claim 2, wherein the spreader system comprises a rear spreader mounted on the truck frame below the rear end of the conveyor for spreading the dispensed material.

5. A dump truck according to claim 1 wherein the conveyor comprises front and rear sprocket shafts, wherein one of the sprocket shafts is longitudinally adjustable to adjust the tension of the endless conveyor and wherein the conveyor comprises bed plate means for supporting the conveyed material, the bed plate means including a slidable bed plate connected to said one sprocket shaft to be longitudinally adjustable therewith.

6. A dump truck according to claim 5 wherein the conveyor comprises a collar receiving said one sprocket shaft and secured to the slidable bed plate to longitudinally adjust the slidable bed plate with said one sprocket shaft.

7. A dump truck according to claim 1 wherein the truck has rear wheels mounted rearwardly of the front spreader.

8. A dump truck according to claim 1 wherein the gravity chute has a top rear edge rearwardly of the front end of the conveyor and further comprising a flexible scraper member along the top rear edge of the chute engageable with the conveyor when the forward end of the dump body is in its lower normal position.

9. In a dump truck having a truck frame with a pair of laterally spaced and longitudinally extending rails, a dump body having a forward end and a rearward end and being pivotally mounted at the rearward end thereof on the truck frame, lift means connected between the truck frame and dump body for raising and lowering the forward end of the dump body between a lower normal position thereof resting on the truck frame and an upper raised position thereof, the dump body forming a receptacle having a bottom, front and laterally spaced sidewalls and a rear tailgate opening and having a tailgate pivotal between an open position thereof and a closed position thereof closing the tailgate opening, the dump body having a bottom structure, providing the bottom of the dump body receptacle, with a pair of laterally spaced and longitudinally extending structural members below the receptacle bottom, the bottom structure having an integrated, longitudinally extending, endless conveyor between said structural members, the conveyor having a front end and a rear end and forming part of the bottom of the dump body receptacle and being operable for longitudinally conveying material within the receptacle for dispensing the material from the receptacle; the improvement wherein the dump body has a rearwardly facing conveyor opening at the forward end of the dump body receptacle and rearwardly of the front end of the conveyor, wherein the conveyor has a drive system selectively operable for running the conveyor in a forward conveyance mode of operation for conveying material within the receptacle forwardly through the conveyor opening and dispensing the material off the front end of the conveyor, and wherein the dump truck comprises a gravity chute mounted on the truck frame between the longitudinally extending rails for receiving material dispensed off the front end of the conveyor and a spreader system comprising a front spreader mounted on the truck frame below the chute for spreading the dispensed material.

10. A dump truck according to claim 9 wherein the conveyor drive system is selectively operable for running the conveyor in a rearward conveyance mode of operation for conveying material within the receptacle rearwardly and dispensing the material off the rear end of the conveyor.

11. A dump truck according to claim 10 wherein the conveyor drive system comprises a reversible motor for running the conveyor in each direction and a selector for selectively operating the reversible motor for running the conveyor in each direction.

12. In a dump truck having a truck frame with a pair of laterally spaced and longitudinally extending rails, a dump body having a forward end and a rearward end and being pivotally mounted at the rearward end thereof on the truck frame, lift means connected between the truck frame and the dump body for raising and lowering the forward end of the dump body between a lower normal position thereof resting on the truck frame and an upper raised position thereof, the dump body forming a receptacle having a bottom, front and laterally spaced sidewalls and a rear tailgate opening and having a tailgate pivotal between an open position thereof and a closed position thereof closing the tailgate opening, the dump body having a bottom structure, providing the bottom of the dump body receptacle, with a pair of laterally spaced and longitudinally extending structural members below the receptacle bottom, the bottom structure having an integrated, longitudinally extending, endless conveyor between the structural members, the conveyor having a front end and a rear end and forming part of the bottom of the dump body receptacle, the conveyor being operable for longitudinally conveying material within the receptacle for dispensing the material from the receptacle; the improvement wherein the dump body has a rearwardly facing conveyor opening at the forward end of the dump body and rearwardly of the front end of the conveyor, wherein the conveyor comprises a drive system selectively operable for running the conveyor in a forward conveyance mode of operation for conveying material within the receptacle forwardly through the conveyor opening and dispensing the material off the front end of the conveyor, and wherein the dump truck comprises a gravity chute mounted on the truck frame between the longitudinally extending rails for receiving material dispensed off the front end of the conveyor.

13. A dump truck according to claim 12 wherein the gravity chute has a top rear edge rearwardly of the front end of the conveyor and wherein the dump truck comprises a flexible scraper member along the top rear edge of the chute engageable with the conveyor when the forward end of the dump body is in its lower normal position.

14. A dump truck according to claim 12 wherein the gravity chute has a top front edge forwardly of the front end of the conveyor and wherein the dump truck comprises a front generally upright deflector along the top front edge of the gravity chute.

15. In a dump truck having a truck frame with a pair of laterally spaced and longitudinally extending rails, a dump body having a forward end and a rearward end and being pivotally mounted at the rearward end thereof on the truck frame, lift means connected between the truck frame and dump body for raising and lowering the forward end of the dump body between a lower normal position thereof resting on the truck frame and an upper raised position thereof, the dump body forming a receptacle having a bottom, front and laterally spaced sidewalls and a rear tailgate opening and having a tailgate pivotal between an open position thereof and a closed position thereof closing the tailgate opening, the dump body having a bottom structure, providing the bottom of the dump body receptacle, with an integrated, longitudinally extending, endless conveyor having a front end and a rear end and forming part of the bottom of the dump body receptacle, the conveyor being operable for longitudinally conveying material within the receptacle for dispensing the material from the receptacle, and a spreader system mounted on the truck for spreading the material dispensed by the conveyor; the improvement wherein the dump body has a rearwardly facing conveyor opening at the forward end of the dump body receptacle and rearwardly of the front end of the conveyor, wherein the conveyor has a drive system selectively operable for running the conveyor in a forward conveyance mode of operation for conveying material within the receptacle forwardly through the conveyor opening and dispensing the material off the front end of the conveyor and between the longitudinally extending rails of the truck frame, and wherein the spreader system comprises a front spreader below the front end of the conveyor for spreading the dispensed material.

16. In a dump truck having a truck frame with a pair of laterally spaced and longitudinally extending rails, a dump body having a forward end and a rearward end and being pivotally mounted at the rearward end thereof on the truck frame, lift means connected between the truck frame and dump body for raising and lowering the forward end of the dump body between a lower normal position thereof resting on the truck frame and an upper raised position thereof, the dump body forming a receptacle having a bottom, front and laterally spaced sidewalls and a rear tailgate opening and having a tailgate pivotal between an open position thereof and a closed position thereof closing the tailgate opening, the dump body having a bottom structure, providing the bottom of the dump body receptacle, with an integrated, longitudinally extending, endless conveyor having a front end and a rear end and forming part of the bottom of the dump body receptacle, the conveyor being operable for longitudinally conveying material within the receptacle for dispensing the material from the receptacle, and a spreader system mounted on the truck for spreading the material dispensed by the conveyor; the improvement wherein the dump body has a rearwardly facing conveyor opening at the forward end of the dump body receptacle and rearwardly of the front end of the conveyor, wherein the conveyor has a drive system selectively operable for running the conveyor in a forward conveyance mode of operation for conveying material within the receptacle forwardly through the conveyor opening and dispensing the material off the front end of the conveyor, wherein the dump truck comprises a discharge opening between the longitudinally extending rails for receiving material dispensed off the front end of the conveyor, and wherein the spreader system comprises a front spreader below the discharge opening for spreading the dispensed material.

* * * * *